US006890874B1

(12) United States Patent
Li et al.

(10) Patent No.: US 6,890,874 B1
(45) Date of Patent: May 10, 2005

(54) ELECTRO-OPTIC CERAMIC MATERIAL AND DEVICE

(75) Inventors: Kewen K. Li, Andover, MA (US); Yalin Lu, Chelmsford, MA (US); Qingwu Wang, Chelmsford, MA (US)

(73) Assignee: Corning Incorporated, Corning, NY (US)

(*) Notice: Subject to any disclaimer, the term of this patent is extended or adjusted under 35 U.S.C. 154(b) by 98 days.

(21) Appl. No.: 10/139,857

(22) Filed: May 6, 2002

(51) Int. Cl.$^7$ .................. C04B 35/499; C04B 35/497
(52) U.S. Cl. ............... 501/134; 501/136; 252/62.9 R; 252/62.9 PZ
(58) Field of Search .................. 501/134, 136; 252/62.9 R, 62.9 PZ

(56) References Cited

U.S. PATENT DOCUMENTS

| | | | | |
|---|---|---|---|---|
| 3,666,666 | A | | 5/1972 | Haertling .................. 252/62.9 |
| 3,923,675 | A | | 12/1975 | Mazdiyasni et al. ....... 252/62.9 |
| 4,019,915 | A | | 4/1977 | Miyauchi et al. ........ 106/73.31 |
| 4,057,324 | A | | 11/1977 | Kawashima et al. ........ 350/150 |
| 4,994,421 | A | | 2/1991 | Mehrotra .................. 501/139 |
| 5,030,604 | A | | 7/1991 | Chen et al. ............... 501/135 |
| 5,032,558 | A | * | 7/1991 | Bailey et al. .............. 501/137 |
| 5,135,897 | A | | 8/1992 | Uchino et al. ............. 501/136 |
| 5,318,725 | A | | 6/1994 | Sandhage .................. 252/520 |
| 5,345,139 | A | | 9/1994 | Gururaja et al. ........... 310/358 |
| 5,668,071 | A | * | 9/1997 | Kashiwaya et al. ......... 501/136 |
| 5,804,907 | A | * | 9/1998 | Park et al. ................. 310/358 |
| 6,004,500 | A | | 12/1999 | Safari et al. .............. 264/610 |
| 6,137,619 | A | | 10/2000 | Chen et al. ................ 359/251 |
| 6,143,366 | A | | 11/2000 | Lu ........................... 427/377 |
| 6,175,667 | B1 | | 1/2001 | Wang et al. .................. 385/3 |
| 6,300,267 | B1 | * | 10/2001 | Chen et al. ................ 501/135 |
| 6,330,097 | B1 | | 12/2001 | Chen et al. ................ 359/239 |
| 6,358,433 | B1 | | 3/2002 | Tan et al. .................. 252/62.9 |
| 6,620,752 | B2 | * | 9/2003 | Messing et al. ............ 501/136 |
| 2001/0035123 | A1 | | 11/2001 | Lee et al. ..................... 117/3 |
| 2003/0002131 | A1 | | 1/2003 | Zou et al. |
| 2003/0220184 | A1 | * | 11/2003 | Li et al. .................... 501/134 |

FOREIGN PATENT DOCUMENTS

| | | |
|---|---|---|
| EP | 0 666 244 | 10/1999 |
| GB | 2200106 | 7/1988 |
| WO | WO 01/37033 | 5/2001 |
| WO | WO 01/64600 | 9/2001 |

OTHER PUBLICATIONS

Uchino K "Electro–optic ceramics and their display applications" *Ceramics Intl, Elsevier applied Science Publ*, vol. 21, No. 5, 1995, pp. 309–315.

"Dielectric and Piezoelectric Properties of Lanthanum–modified Lead Magnesium Niobium–Lead Titanate Ceramics", N. Kim, W. Huebner, S.J. Jang, T.R. Shrout, Ferroelectrics, 1989, vol. 93, pp. 341–349.

Lu, Yalin et al., "Fabrication and optical characterization of $Pb(Mg_{1/3}Nb_{2/3})O_3$–$PbTiO_3$ planar thin film optical waveguides", Applied Physics Letters, vol. 72, No. 23, pp. 2927–2929, Jun. 8, 1998.

Lu, Yalin et al., "Structural and electro–optic properties in lead magnesium niobate titanate thin films", Applied Physics Letters, vol. 74, No. 20, pp. 3038–3040, May 17, 1999.

Zheng, Jianjun, et al., "Photoluminescence in erbium–doped $Pb(Mg_{1/3}Nb_{2/3})$ $O_3$–$PbTiO_3$ thin films", Applied Physics Letters, vol. 75, No. 22, pp. 3470–3472, Nov. 29, 1999.

Lu, Yalin et al, "In–plane electro–optic anisotropy of $(1-x)Pb(Mg_{1/3}Nb_{2/3})O_3$–$xPbTiO_3$ thin films grown on (100)–cut $LaAlO_3$", Applied Physics Letters, vol. 74, No. 25, pp. 3764–3766, Jun. 21, 1999.

Ye, Z.–G. et al., "Morphotropic domain structures and phase transitions in relaxor–based piezo–/ferroelectric $(1-x)Pb(Mg_{1/3}Nb_{2/3})O_3$–$xPbTiO_3$ single crystals", Journal of Applied Physics, vol. 87, No. 5, pp. 2312–2319, Mar. 1, 2000.

Gupta, Surya et al.,"Role of charge compensation mechanism in La–modified $Pb(Mg_{1/3}Nb_{2/3})O_3$–$PbTiO_3$ ceramics: Enhanced ordering and pyrochlore formation", Journal of Applied Physics, vol. 80, No. 10, pp. 5875–5883, Nov. 15, 1996.

Comyn, T. et al., "Modification of mechanical properties in PMNT 90:10 by substitution with La", Journal of the European Ceramic Society 20 (2000), pp. 2035–2038.

Kim, N. et al., "Dielectric and Piezoelectric Properties of Lanthanum–Modified Lead Magnesium Niobium–Lead Titanate Ceramics", Ferroelectrics, vol. 93, pp. 341–349, 1989.

McHenry, D.A. et al., "Electrical and Optical Properties of Relaxor Ferroelectrics", Ferroelectrics, vol. 102, pp. 161–171, 1990.

McHenry, D.A., et al., "Optical Properties of Hot Pressed Relaxor Ferroelectrics", Ferroelectrics, vol. 93, pp. 351–359, 1989.

* cited by examiner

*Primary Examiner*—Karl Group
(74) *Attorney, Agent, or Firm*—Siwen Chen; James V. Suggs

(57) ABSTRACT

The present invention provides an electro-optic ceramic material including lead, magnesium, niobium and titanium having a propagation loss of less than about 3 dB/cm and a quadratic electro-optic coefficient of greater than about $2 \times 10^{-16}$ $m^2/V^2$ at 20° C. at a wavelength of 1550 nm. The present invention also provides electro-optic devices including an electro-optic ceramic material including lead, magnesium, niobium and titanium having a propagation loss of less than about 3 dB/cm and a quadratic electro-optic coefficient of greater than about $2 \times 10^{-16}$ $m^2/V^2$ at 20° C. at a wavelength of 1550 nm. The materials and devices of the present invention are useful in optical communications applications such as intensity and phase modulation, switching, and polarization control.

18 Claims, 7 Drawing Sheets

ELECTRO-OPTIC CERAMIC MATERIAL AND DEVICE

BACKGROUND OF THE INVENTION

1. Field of the Invention

The present invention relates to materials and devices for optical communications, and more particularly to electro-optic ceramic materials having high transparency and electro-optic activity and devices constructed using such materials.

2. Technical Background

While much progress has been made in the last thirty years in developing optical switches or modulators, current devices are not satisfactory for every application. Many active optical devices, such as intensity attenuators, used in present-day systems are based on electromechanical actuation. In one type of conventional device, optical fibers are positioned end to end and mechanically moved into or out of line. In another type of conventional device, mirrors are rotated to direct beams into or away from a receiving fiber. This can be accomplished mechanically, or with piezoelectric or electrostatic devices. Devices based on motion of components have slow switching times, and may have unacceptable environmental or long-term stability.

Optical devices without moving parts have been designed to address some of the switching speed and stability problems mentioned above. These devices depend on materials that can change optical properties without bulk motion, such as liquid crystalline materials and electro-optic crystal materials. Liquid crystals tend to have relatively slow switching speeds, as the mechanism of actuation is rotation of entire molecules under the influence of an electric field. Electro-optic crystal materials such as $LiNbO_3$ have much higher switching speeds, but are extremely polarization dependent.

One especially promising class of materials for use in active optical devices is electro-optic ceramic materials. Electro-optic ceramics are generally composed of ferroelectric complex oxides, and are polycrystalline. Due to the random orientations of the individual crystalline grains, electro-optic ceramics are optically isotropic in the absence of an electric field. In the presence of an electric field, electro-optic ceramic materials become anisotropic, with a lower refractive index in the direction of the field than perpendicular to the field. The material may be switched between isotropic and anisotropic states by controlling the electric field. For use in electro-optic applications, it is desirable that electro-optic ceramic materials have high transparency, high quadratic electro-optic coefficients and low switching hysteresis.

Lead lanthanum zirconate titanate (PLZT) is the most common electro-optic ceramic material. PLZT materials can be formed to be substantially transparent to light having wavelengths in the range of 0.5 μm to 7 μm. Properties of PLZT compositions can be tuned by adjusting the relative amounts of lead, lanthanum, zirconium and titanium. For example, a PLZT composition having the formula $Pb_{0.91}La_{0.09}(Zr_{0.65}Ti_{0.35})_{0.9775}O_3$ has a quadratic electro-optic coefficient $R=9.2\times10^{-16}$ m²/V², but has extremely large hysteresis at low fields, making it unsuitable for high-speed electro-optic applications. By increasing the lanthanum concentration, one can improve hysteresis at the expense of electro-optic activity. For example, a PLZT composition having the formula $Pb_{0.9025}La_{0.0975}(Zr_{0.65}Ti_{0.35})_{0.975625}O_3$ has a lower quadratic electro-optic coefficient ($R\sim2.5\times10^{-16}$ m²/V²), but has temperature performance and hysteresis suitable for use in devices for optical telecommunications. PLZT materials also suffer from high brittleness and low toughness. Attempts to find new electro-optic ceramics have generally failed to provide an electro-optic ceramic material that has high transparency, a high quadratic electro-optic coefficient, and little hysteresis.

SUMMARY OF THE INVENTION

One aspect of the present invention relates to an electro-optic ceramic material including lead, magnesium, niobium, and titanium, wherein the electro-optic material has a propagation loss of less than about 3 dB/cm and a quadratic electro-optic coefficient of greater than about $2\times10^{-16}$ m²/V² at 20° C. at a wavelength of 1550 nm.

Another aspect of the present invention relates an electro-optic ceramic material including lead, magnesium, niobium, and titanium, wherein the electro-optic material has a propagation loss of less than about 3 dB/cm and a quadratic electro-optic coefficient of greater than about $2\times10^{-16}$ m²/V² at 20° C. at a wavelength of 1550 nm, and wherein the electro-optic ceramic material has a lead cation fraction of between about 0.40 and about 0.51; a lanthanum cation fraction of less than about 0.06; a magnesium cation fraction of between about 0.06 and about 0.19; a niobium cation fraction of between about 0.16 and about 0.36; and a titanium cation fraction of between about 0.02 and about 0.27.

Another aspect of the present invention relates to an electro-optic ceramic material having the formula $Pb_{1-z}La_z[(Mg_tNb_{1-t})_xTi_{1-x}]_{1-z/4}O_{3+x/2-3xt/2-xz/8+3xtz/8}$, wherein x is between about 0.60 and about 0.95, z is between about 0 and about 0.08, and t is between about 0.30 and about 0.36.

Another aspect of the present invention relates to an electro-optic device including an electro-optic ceramic material including lead, magnesium, niobium and titanium, wherein the electro-optic ceramic material has a propagation loss of less than about 3 dB/cm and a quadratic electro-optic coefficient of greater than about $2\times10^{-16}$ m²/V² at 20° C. at a wavelength of 1550 nm.

Another aspect of the present invention relates to an electro-optic device including an electro-optic ceramic material including lead, magnesium, niobium and titanium, wherein the electro-optic ceramic material has a propagation loss of less than about 3 dB/cm and a quadratic electro-optic coefficient of greater than about $2\times10^{-16}$ m²/V² at 20° C. at a wavelength of 1550 nm, and wherein the electro-optic ceramic material has a lead cation fraction of between about 0.40 and about 0.51; a lanthanum cation fraction of less than about 0.06; a magnesium cation fraction of between about 0.06 and about 0.19; a niobium cation fraction of between about 0.16 and about 0.36; and a titanium cation fraction of between about 0.02 and about 0.27.

The materials and devices of the present invention result in a number of advantages over conventional materials and devices. The materials of the present invention have high transparency over a wide wavelength range as well as high quadratic electro-optic coefficients. The materials of the present invention have little hysteresis, making them suitable for use in electro-optic devices for telecommunications applications. The materials of the present invention are less brittle and more tough than PLZT ceramics, making them more suitable for use in devices for use in telecommunications systems. Additional features and advantages of the invention will be set forth in the detailed description which follows, and in part will be readily apparent to those skilled in the art from the description or recognized by practicing the invention as described in the written description and claims hereof, as well as in the appended drawings.

It is to be understood that both the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification. The drawings are not necessarily to scale. The drawings illustrate one or more embodiment(s) of the invention, and together with the description serve to explain the principles and operation of the invention.

DETAILED DESCRIPTION OF THE PREFERRED EMBODIMENTS

Figure 1:
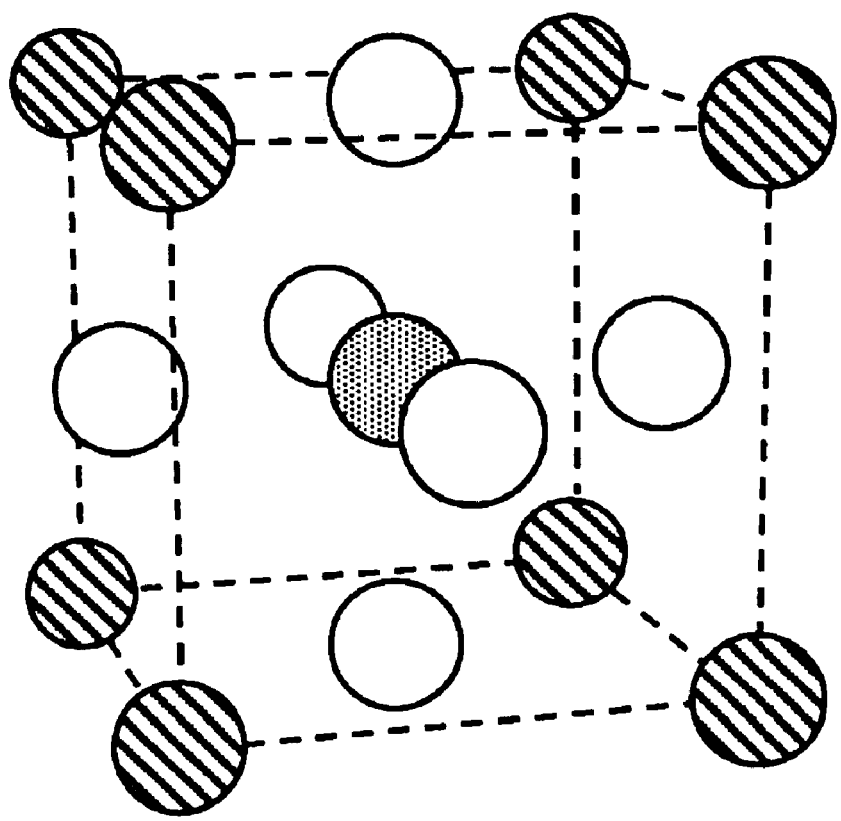
FIG. 1 is a schematic depiction of a general psuedocubic perovskite structure.

The present invention provides an electro-optic ceramic material with high transparency, high quadratic electro-optic coefficients, and low hysteresis. The electro-optic ceramic materials of the present invention are lead magnesium niobate-lead titanate-based ceramics having a propagation loss of less than about 3 dB/cm and a quadratic electro-optic coefficient of greater than about $2\times10^{-16}$ m$^2$/V$^2$ at 20° C. at a wavelength of 1550 nm. The electro-optic ceramic materials of the present invention are useful in the fabrication of electro-optic devices such as, for example, modulators, switches, phase retarders, polarization controllers, and variable optical attenuators.

Electro-optic devices materials are materials that change their birefringence in the presence of an electric field. The utility of an electro-optic material in an electro-optic device depends, in large part, on the magnitude of its electro-optic coefficients. The birefringence $\Delta n$ of an electro-optic material in the presence of an electric field can be described by the equation $$\Delta n = \Delta n_0 + \frac{n^3}{2}(\gamma \cdot E + R \cdot E^2)$$

where $\Delta n_0$ is the birefringence of the material in the absence of an electric field, n is the ordinary refractive index of the material, E is the magnitude of the applied electric field, $\gamma$ is the linear electro-optic coefficient, and R is the quadratic electro-optic coefficient. As the electro-optic ceramic materials of the present invention are isotropic, $\Delta n_0$ and $\gamma$ are essentially zero, leaving the electro-optic activity on the shoulders of the quadratic electro-optic coefficient. The lead magnesium niobate electro-optic ceramic materials described herein may have quadratic electro-optic coefficients R of greater than about $2\times10^{-16}$ m$^2$/V$^2$, greater than $3\times10^{-16}$ m$^2$/V$^2$, and even greater than about $5\times10^{-16}$ m$^2$/V$^2$ at 20° C. at a wavelength of 1550 nm.

While electro-optic activity is important, a material with high electro-optic activity will be rendered useless if it is not sufficiently transparent at the wavelength of interest. Transparency at telecommunications wavelengths is an important feature of the electro-optic ceramic materials of the present invention. As will be described more fully below, the materials of the present invention can be formed by the skilled artisan to be very dense and relatively free of scattering voids and undesired impurity phases. The electro-optic ceramic materials of the present invention have propagation losses of less than about 3 dB/cm, and preferably less than about 1.5 dB/cm, and even more preferably less than about 1.0 dB/cm at 1550 nm.

In one aspect of the present invention, the electro-optic ceramic material includes lead, magnesium, niobium and titanium, and preferably includes lanthanum. The relative amounts of individual atomic species may be described by a cation fraction. As used herein, a cation is any atomic species bearing a positive formal charge. For example, though the titanium atom is part of the polyatomic titanium anion (TiO$_3^{2-}$) in the present compositions, the titanium atom itself has a +4 formal charge, and is thus considered herein to be a cation. The cation fraction of a particular atomic species is the ratio of the number of atoms of the particular atomic species to the total number of cationic atoms. For example, for the electro-optic ceramic material

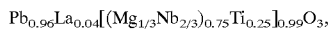

the cation fractions may be calculated as follows:

Lead cation fraction=0.96/[0.96+0.04+((⅓+⅔)·0.75+0.25)·0.99]= 0.482

Lanthanum cation fraction=0.04/[0.96+0.04+((⅓+⅔)·0.75+ 0.25)·0.99]=0.020

Magnesium cation fraction=[⅓·0.75·0.99]/[0.96+0.04+((⅓+ ⅔)·0.75+0.25)·0.99]=0.124

Niobium cation fraction=[⅔·0.75·0.99]/[0.96+0.04+((⅓+⅔)·0.75+ 0.25)·0.99]=0.249

Titanium cation fraction=[0.25·0.99]/[0.96+0.04+((⅓+⅔)·0.75+ 0.25)·0.99]=0.124

In preferred embodiments of the present invention, the electro-optic ceramic material has a lead cation fraction of between about 0.40 and about 0.51, a lanthanum cation fraction of less than about 0.06, a magnesium cation fraction of between about 0.06 and about 0.19, a niobium cation fraction of between about 0.16 and about 0.36, and a titanium cation fraction of between about 0.02 and about 0.27. The electro-optic ceramic material may have a lead cation fraction of between about 0.45 and about 0.50. The electro-optic ceramic material may have lanthanum cation fraction of between about 0.01 and about 0.05. The electro-optic ceramic material may have a magnesium cation fraction of between about 0.10 and about 0.15. The electro-optic ceramic material may have a niobium cation fraction of between about 0.20 and about 0.29. The electro-optic ceramic material may have a titanium cation fraction of between about 0.07 and about 0.18.

In the electro-optic ceramic materials of the present invention, each crystalline grain desirably has a psuedocubic structure. The psuedocubic structure, shown in FIG. 1, has a unit cell in which the large cations (e.g. $Pb^{2+}$, $La^{3+}$) and the anions (e.g. $O^{2-}$) form a cubic close packed (ccp) array with the smaller cations (e.g. $Mg^{2+}$, $Nb^{5+}$, $Ti^{4+}$) occupying those octahedral holes formed exclusively by anions. Lanthanum-doped lead magnesium niobate—lead titanate materials have a morphotropic phase boundary at a lead titanate fraction of about 33%. In order to further stabilize the desired psuedocubic phase of the lead magnesium niobate electro-optic ceramic material, it may be desirable to include other elements, such as barium. In order to improve thermal stability, density, isotropy and electro-optic activity of the electro-optic ceramic material, it may be desirable to include lanthanum with a lanthanum cation fraction of between about 0.01 and about 0.05. Lanthanum doping reduces the phase transition temperature of the material and therefore increases electro-optic response. Lanthanum doping also increases the formation of glassy phases in the crystalline grains of the material, thereby increasing density. The presence of lanthanum may also make the crystalline structure more purely cubic in nature, making the ceramics more optically uniform, and therefore more highly transparent. Small amounts of other cations may be included in the electro-optic ceramics of the present invention in order to further tune the properties according to methods familiar to the skilled artisan.

Preferred electro-optic ceramics of the present invention may be described by the general formula $$Pb_{1-z}La_z[(Mg_tNb_{1-t})_xTi_{1-x}]_{1-z/4}O_{3+x/2-3xt/2-xz/8+3xtz/8}$$

wherein x is between about 0.6 and about 0.95, z is between about 0 and about 0.08, and t is between about 0.30 and about 0.36. In especially preferred electro-optic ceramic materials of the present invention, z is between about 0.01 and about 0.06. In preferred electro-optic materials of the present invention, t may be between about 0.32 and about 0.34, and x may be between about 0.65 and about 0.90.

The electro-optic ceramic materials of the present invention may be made by methods familiar to the skilled artisan. A wide variety of inorganic compounds may be used as the starting materials. For example, oxides, hydroxides, carbonates, sulfates, acetates or alkoxides of the desired metals may be used to form the ceramics of the present invention. In general, an opaque powder having the desired ceramic stoichiometry is first prepared and dried. For example, the columbite precursor—mixed oxide method has been used to fabricate powders of the materials of the present invention, as described below in Example 1. Other methods, such as chemical co-precipitation and other more advanced techniques, may be used to prepare the powder. Before being densified, the powder may optionally be formed into an opaque powder preform by, for example, cold pressing.

The opaque powder or powder preform may then densified by methods familiar to the skilled artisan to form the ceramic materials of the present invention. For example, a powder preform may be hot-pressed to form a dense, transparent, psuedocubic-structured ceramic as described below in Example 1. Important processing parameters such as hot-pressing temperature, applied pressure, ambient conditions and processing time may be determined by the skilled artisan. Other densification techniques, such as vacuum sintering, isostatic pressing, hot isostatic pressing, or other pressing or sintering methods may be used by the skilled artisan to form the transparent ceramics of the present invention.

Hysteresis is the dependence of the state of a material on the history of an externally modified parameter. For example, in a electro-optic ferroelectric material exhibiting large hysteresis, a field-induced state (e.g. polarization, birefringence) depends not only on the magnitude of the field, but also on the history of the field (e.g. rate of field increase or decrease). The electro-optic ceramic materials of the present invention have very little hysteresis. In these materials, hysteresis is a measure of the work required to displace the ferroelectric domain walls in the material. The hysteresis is closely related both to the defect distribution in the crystal and to the energy barrier separating the different orientational states. High hysteresis is desirable for optical memory devices, while low hysteresis is desirable for optical modulation and switching applications. It is especially desirable for an electro-optic ceramic material to have low hysteresis at room temperature so that devices may be operated without feedback control or external heating. The materials of the present invention exhibit a so-called "slim loop" hysteresis behavior.

The electro-optic ceramic materials described above are useful in the construction of electro-optic devices for telecommunications. Another aspect of the invention is an electro-optic device including a lead magnesium niobate-based electro-optic ceramic material having a propagation loss of less than about 3 dB/cm and a quadratic electro-optic coefficient of greater than about $2\times10^{-16}$ $m^2/V^2$ at a wavelength of 1550 nm. The electro-optic material preferably has a propagation loss of less than about 1.5 dB/cm, and a quadratic electro-optic coefficient of greater than about $5\times10^{-16}$ $m^2/V^2$. The electro-optic ceramic material used in the device may have the compositions described hereinabove. The electro-optic ceramic material may have, for example, lead cation fraction of between about 0.40 and about 0.51, a lanthanum cation fraction of less than about 0.05, a magnesium cation fraction of between about 0.06 and about 0.19, a niobium cation fraction of between about 0.16 and about 0.36, and a titanium cation fraction of between about 0.02 and about 0.27.

An electro-optic device of the present invention may be, for example, an intensity modulator, a phase modulator, a switch, a phase retarder, a polarization controller, or a variable optical attenuator. Exemplary electro-optic devices that may be constructed using the electro-optic ceramic material of the present invention are described in U.S. Pat. No. 6,137,619, and U.S. Pat. No. 6,330,097. Electro-optic devices of the present invention may be constructed in accordance with known techniques for making devices based on other electro-optic materials, such as PLZT.

The invention will be further clarified by the following non-limiting examples which are intended to be exemplary of the invention.

EXAMPLE 1

Figure 2:
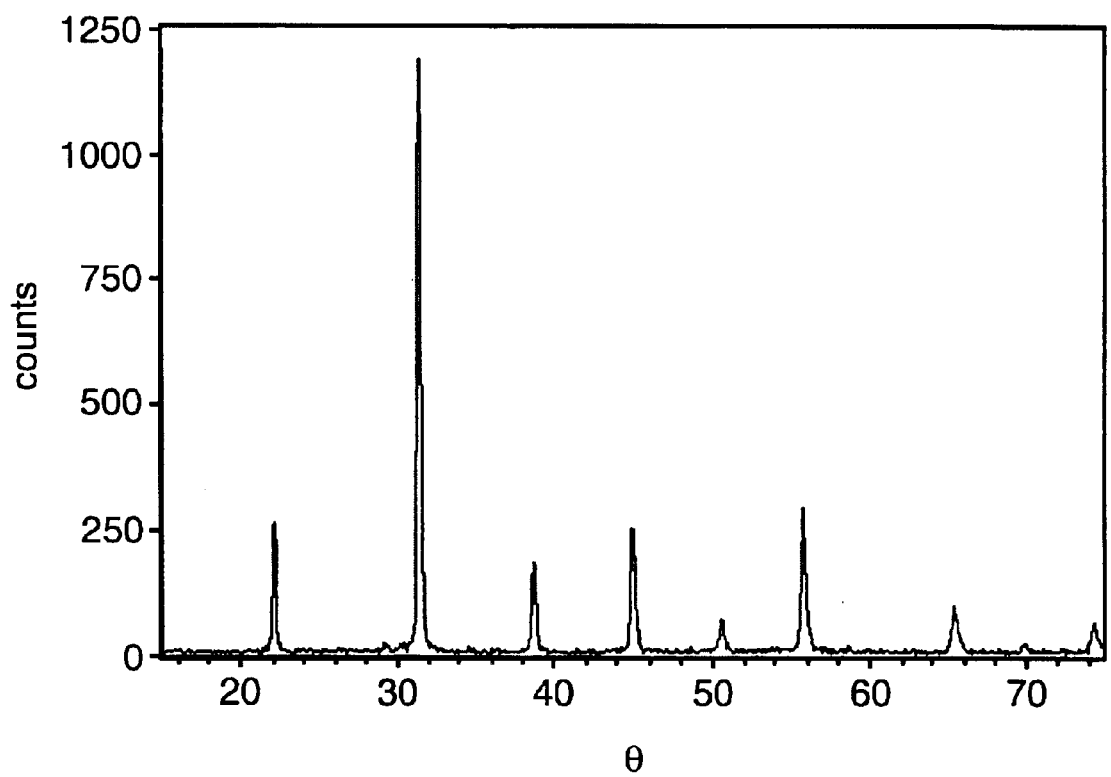
FIG. 2 is an X-ray diffraction spectrum of an undensified powder of the present invention.

An electro-optic ceramic material having the formula $$Pb_{0.96}La_{0.04}[(Mg_{1/3}Nb_{2/3})_{0.75}Ti_{0.25}]_{0.99}O_3$$

was prepared using the columbite precursor—mixed oxide method as follows:

Lead (II) oxide, lanthanum oxide, magnesium carbonate, niobium (V) oxide, and titanium (IV) oxide powders were used as starting materials. The magnesium carbonate and niobium (V) oxide powders (119.7 g total) were combined in amounts corresponding to the stoichiometry of the desired ceramic, and mixed with 175 mL water to form a slurry. The slurry was ball milled using 750 g alumina cylinders in a 1000 mL jar for about 30 minutes, dried at 90° C., and fired at 1000° C. for about 8 hours. The resulting solid was mixed with the stoichiometrically desired amounts of lead (II) oxide (345.7 g), lanthanum oxide (10.5 g), and titanium (IV) oxide (31.2 g), along with 400 mL water. A slight excess (about 2 wt %) of lead (II) oxide was added to counteract the effects of evaporation of lead during processing. The resulting slurry was ball milled for about 30 minutes in a 2000 mL jar with 1500 g alumina cylinders, dried at 90° C. to completely remove the water, then fired at 800° C. for 4 hours. The fired powder was then ball milled with 400 mL organic solvent (e.g. trichloroethylene or acetone) in a 2000 mL plastic jar with 1500 g alumina cylinders. A one hour post annealing may be used to remove the residual organic left in the powder. An XRD of this material is shown in FIG. 2. An opaque cylindrical powder preform (5.1 cm long, 3.2 cm diameter) was formed by pressing the resulting powder in a stainless steel mold at a cold pressure of 140 kgf/cm² (about 2000 psi, or about 13.79 MPa).

Figure 3:
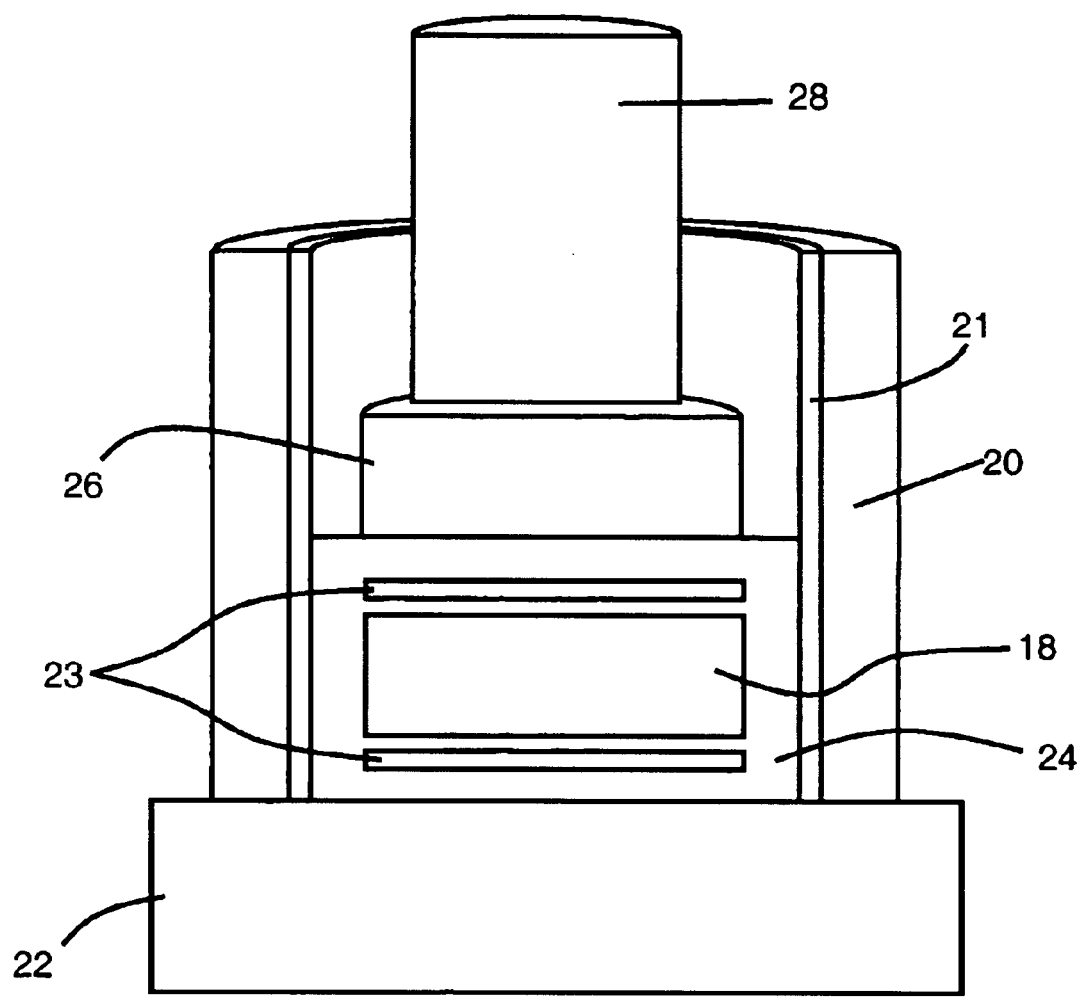
FIG. 3 is a schematic diagram of a hot pressing setup used to fabricate the electro-optic ceramics of the present invention.

The powder preform 18 was loaded into a cylindrical silicon carbide mold 20 lined with a high purity alumina tube 21, as shown in FIG. 3. The silicon carbide mold had an inner diameter of 4.5 cm, and sat on an alumina pedestal 22. Two zirconia discs 23 and high purity magnesium oxide powder 24 were used to isolate the preform from the mold, the pedestal, and from the 4.5 cm diameter alumina top press rod 26. The whole assembly was mounted in a hot press machine, with the alumina top press rod being coupled to the push rod 28 of a ten ton hot press from Thermal Technology Inc, of Santa Rosa, Calif. The chamber of the hot press machine was evacuated down to about 300 mTorr (40 Pa), and the temperature in the chamber was heated at a rate of about 5° C./min. When the temperature reached 650° C., oxygen was admitted to the chamber at a pressure of 3 psi (20.69 kPa). This pressure of oxygen was maintained throughout the remainder of the process. When the temperature reached 750° C., the press rod was actuated to press the preform at a pressure of 2000 psi (13.793 MPa). The preform was pressed at 1250° C. for 16 hours. The pressed slug was allowed to cool to room temperature in the press at a negligible pressure, removed from the mold, sliced and polished.

EXAMPLE 2

The following electro-optic ceramic materials having the formula

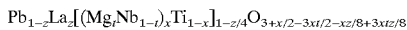

$$Pb_{1-z}La_z[(Mg_tNb_{1-t})_xTi_{1-x}]_{1-z/4}O_{3+x/2-3xt/2-xz/8+3xtz/8}$$

were prepared by the method of Example 1. These materials exhibited acceptable transparency for use in devices for optical telecommunications.

| Example | x | t | z |
|---|---|---|---|
| 2a | 0.95 | 1/3 | 0 |
| 2b | 0.90 | 1/3 | 0.01 |
| 2c | 0.90 | 1/3 | 0.05 |
| 2d | 0.875 | 1/3 | 0.01 |
| 2e | 0.85 | 1/3 | 0.01 |
| 2f | 0.80 | 1/3 | 0.02 |
| 2g | 0.75 | 1/3 | 0.02 |
| 2h | 0.75 | 1/3 | 0.03 |

-continued

| Example | x | t | z |
|---|---|---|---|
| 2i | 0.75 | 1/3 | 0.0325 |
| 2j | 0.75 | 1/3 | 0.035 |
| 2k | 0.75 | 1/3 | 0.04 |
| 2l | 0.67 | 1/3 | 0.03 |
| 2m | 0.67 | 1/3 | 0.04 |
| 2n | 0.67 | 1/3 | 0.05 |

EXAMPLE 3

Figure 4:
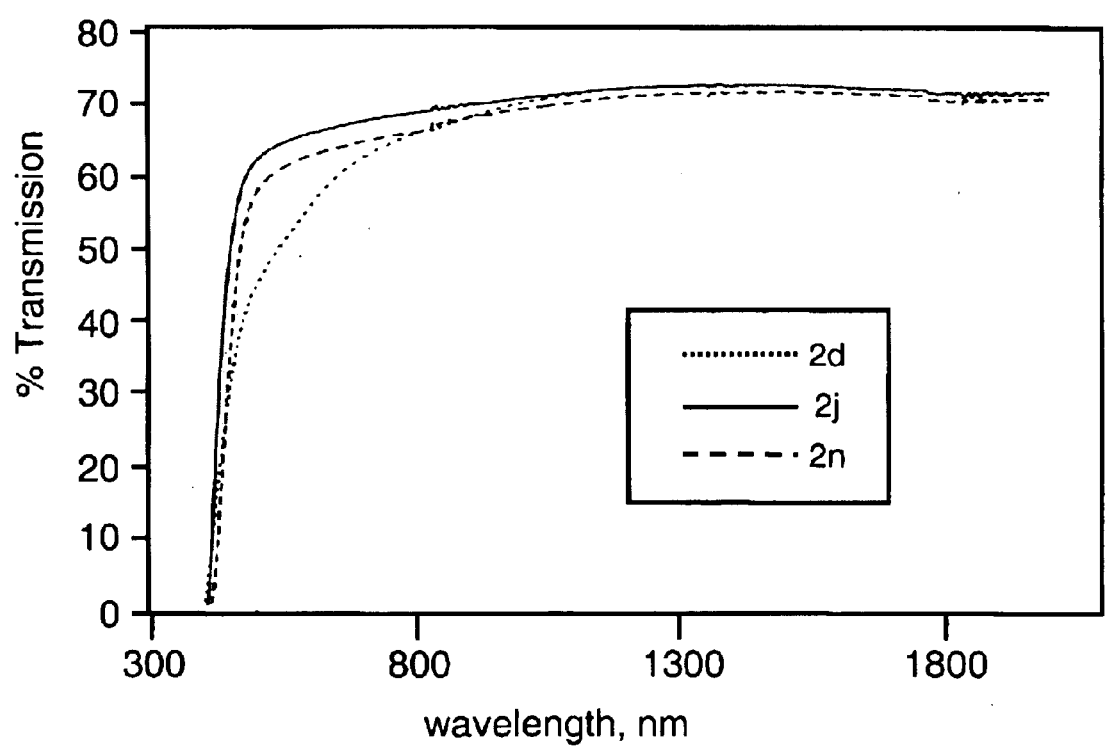
FIG. 4 is a transmission spectrum of an electro-optic ceramic material of the present invention.

FIG. 4 shows a transmission spectrum of polished, uncoated 1.44 mm thick slices of the electro-optic ceramic materials of Examples 2d, 2j and 2n. The transmittance of all three samples is above 70% over a wavelength range from about 1000 nm to 1800 nm. The propagation loss of the material may be calculated from the transmittance using the equation $$\%T = \left[1 - \left(\frac{n-1}{n+1}\right)^2\right]^2 \cdot 10^{-0.1 \cdot \text{[Propagation Loss (dB/cm)][Path Length (cm)]}}$$

Since at 1550 nm, the refractive index of these materials is about 2.3, the propagation loss is less than 1 dB/cm. The transparency of the ceramics of the present invention is comparable to the transparency of conventional PLZT materials.

EXAMPLE 4

Figure 5:
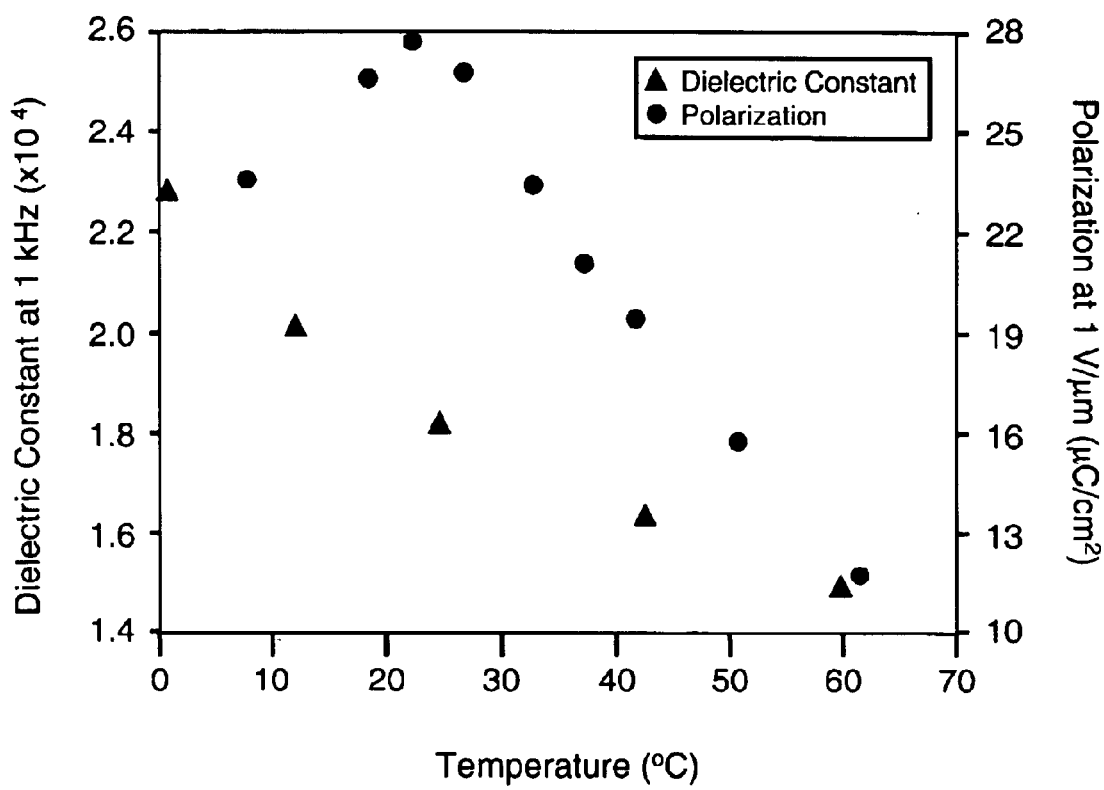
FIG. 5 is a graph of dielectric constant at 1 kHz and polarization at 1 V/$\mu$m versus temperature for an electro-optic ceramic material of the present invention.

Small samples (5 mm×5 mm×0.7 mm) of the $Pb_{0.96}La_{0.04}[(Mg_{1/3}Nb_{2/3})_{0.75}Ti_{0.25}]_{0.99}O_3$ material of Example 1 were prepared for dielectric measurements by coating with nickel electrodes. Dielectric constants were measured in an environmental chamber (from Tenney Environmental of Williamsport, Pa.) using a Model SR720 LCR meter from Stanford Research Systems of Sunnyvale, Calif. Dielectric constants at I kHz and polarization at 1 V/$\mu$m at different temperatures for this material are shown in FIG. 5.

EXAMPLE 5

Figure 6:
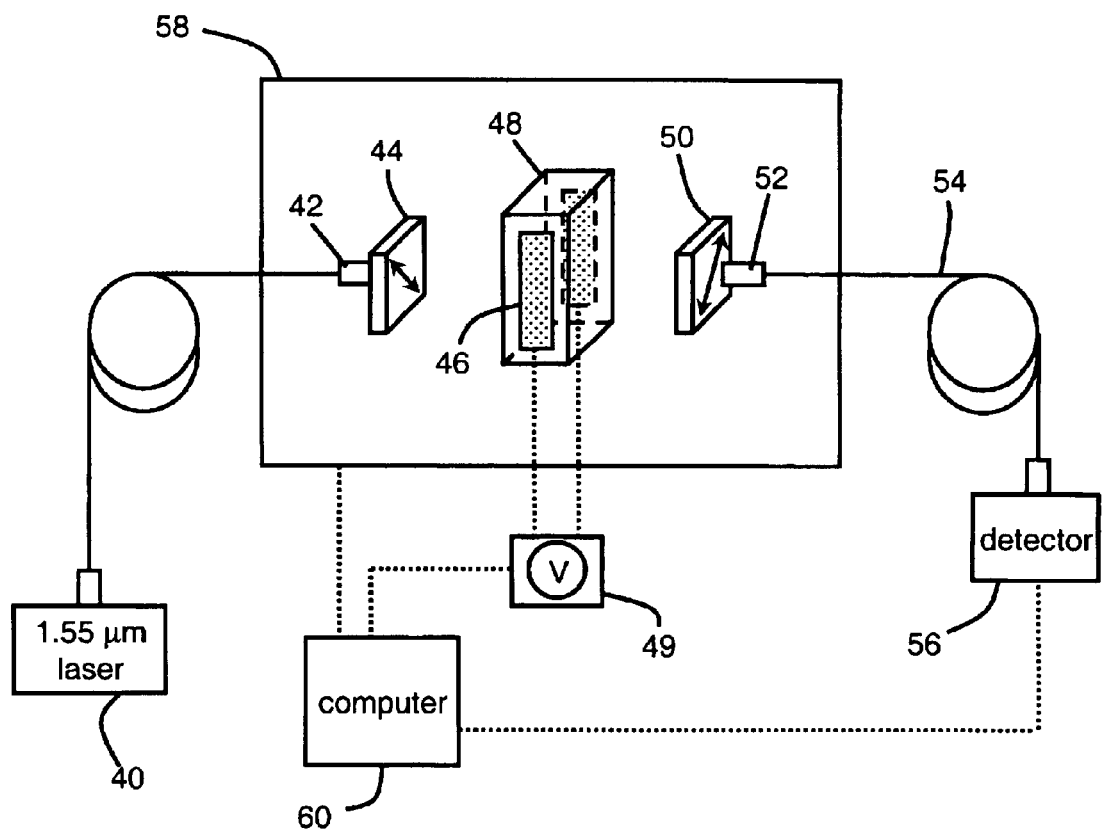
FIG. 6 is a schematic diagram of an experimental setup used to measure electro-optic coefficients.

The quadratic electro-optic constant of the $Pb_{0.96}La_{0.04}[(Mg_{1/3}Nb_{2/3})_{0.75}Ti_{0.25}]_{0.99}O_3$ material of Example 1 was measured using the experimental setup shown in FIG. 6. Light from a fiber-pigtailed 1550 nm laser diode 40 is collimated using a GRIN lens 42, and passed through an input polarizer 44. Electrodes 46 are deposited on opposite faces of a polished sample 48 in order to allow the application of an electric field through the sample by a power source 49. The sample is placed in the light path with the direction of the applied electric field perpendicular to the direction of the light path and at a 45° angle to the polarization of the beam. After emerging from the sample the light is passed through an output polarizer 50 having its polarization axis set to be perpendicular to the polarization axis of the input polarizer 44. Light emerging from the output polarizer is coupled into a detector fiber 54 using a GRIN lens 52, and is detected by a photodetector 56. The free space portion of the setup is placed inside a temperature-controlled environmental chamber 58. A computer 60 is used to control the applied electric field, and to collect temperature and optical data. When the system is integrated with a function generator and an oscilloscope (not shown) by the skilled artisan, it may be used for measurement of response speed.

When no electric field is applied, the sample has no effect on the polarization of the beam; therefore, no light makes it to the detector due to the action of the crossed polarizers. As the applied electric field increases, the sample becomes birefringent due to the electro-optic effect, and rotates the polarization of the beam. At a voltage $V_\pi$, the polarization of the beam is rotated by the sample enough to be parallel to the polarization axis of the second polarizer, maximizing the intensity of the detected signal. Assuming the material's native birefringence ($\Delta n_0$) and linear electro-optic coefficient $\gamma$ are zero, the quadratic electro-optic coefficient R may be calculated from the equation $$R = \frac{d^2 \lambda}{V_\pi^2 n^3 L}$$

where d is the distance between electrodes (i.e. the width of the sample), n is the refractive index of the sample at the wavelength $\lambda$, and L is the path length of the beam in the sample.

Figure 7:
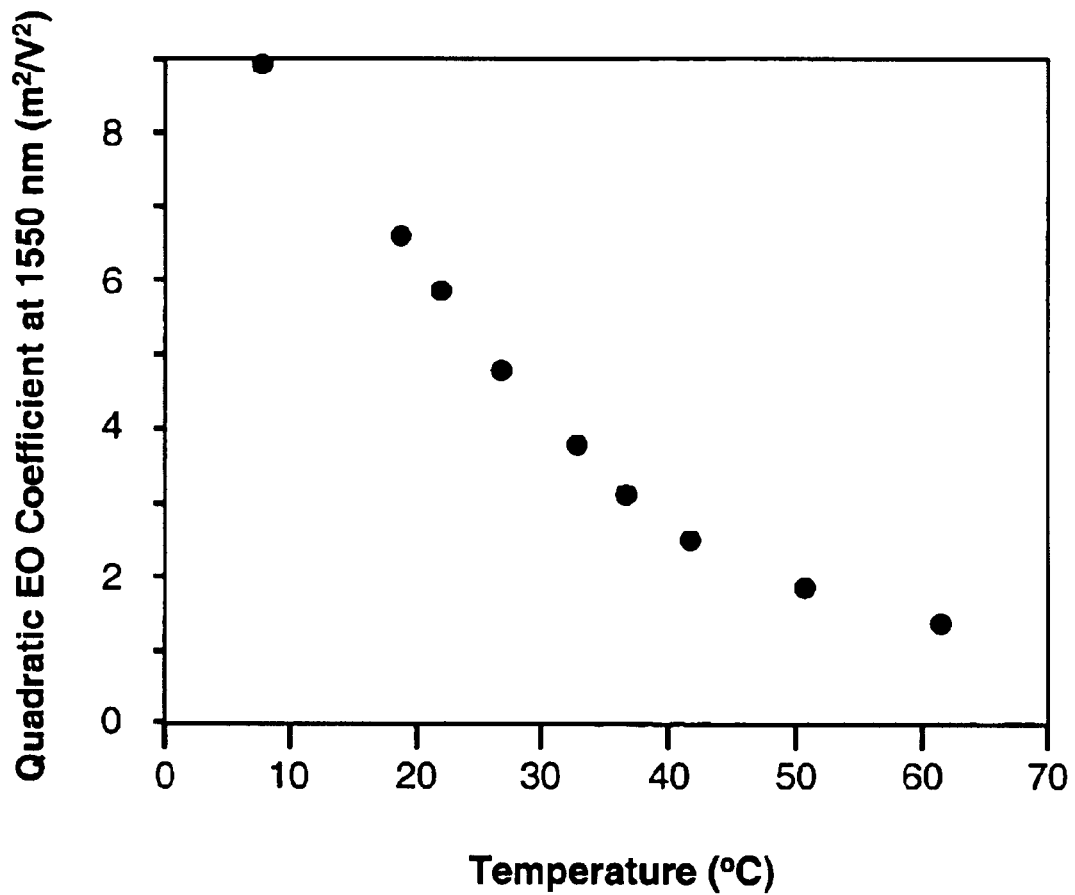
FIG. 7 is a graph of electro-optic coefficient versus temperature for an electro-optic ceramic material of the present invention.

Samples of $Pb_{0.96}La_{0.04}[(Mg_{1/3}Nb_{2/3})_{0.75}Ti_{0.25}]_{0.99}O_3$ were cut from a 1.44 mm thick wafer polished on both sides. The samples had a width of 0.44 mm and a height of 2.5 mm. The parallel side surfaces of each sample were polished, plasma etched for 3 min, then coated with Pt/Au electrodes (250 Å/2500 Å). The samples were annealed at 200° C. for one hour, and at 100° C. for an additional hour to reduce the internal stresses formed in the sample preparation process. The quadratic electro-optic coefficient of the sample at 1550 m at different temperatures is shown in FIG. 7. The quadratic electro-optic coefficient of $Pb_{0.96}La_{0.04}[(Mg_{1/3}Nb_{2/3})_{0.75}Ti_{0.25}]_{0.99}O_3$ at 20° C. is $6.6 \times 10^{-16}$ $m^2/V^2$ at 1550 nm.

It will be apparent to those skilled in the art that various modifications and variations can be made to the present invention without departing from the spirit and scope of the invention. For example, the skilled artisan may add other cationic or anionic species to the materials of the present invention. While the electro-optic ceramic materials of the present invention have been described with reference to use at telecommunications wavelengths, the skilled artisan will recognize that they may be used in other wavelength regimes. Thus, it is intended that the present invention cover the modifications and variations of this invention provided they come within the scope of the appended claims and their equivalents.

What is claimed is:

1. An electro-optic ceramic material consisting essentially of the oxides of
   lead,
   magnesium,
   niobium,
   titanium, and
   lanthanum
   wherein the electro-optic material has a propagation loss of less than about 3 dB/cm and a quadratic electro-optic coefficient of greater than about $2 \times 10^{-16}$ $m^2/V^2$ at 20° C. at a wavelength of 1550 nm, and
   wherein the ceramic material has
   a lead cation fraction of between about 0.40 and about 0.51;
   a lanthanum cation fraction of between 0.02 and about 0.06;
   a magnesium cation fraction of between about 0.06 and about 0.19;
   a niobium cation fraction of between about 0.16 and about 0.36; and
   a titanium cation fraction of between about 0.02 and about 0.27.

2. The electro-optic ceramic material of claim 1 wherein the propagation loss of the material is less than about 1.5 dB/cm at a wavelength of 1550 nm.

3. The electro-optic ceramic material of claim 1 wherein the material has a quadratic electro-optic coefficient at 1550 nm of greater than about $3 \times 10^{-16}$ $m^2/V^2$ at 20° C.

4. The electro-optic ceramic material of claim 1 wherein the electro-optic ceramic material has a lead cation fraction of between about 0.45 and about 0.50.

5. The electro-optic ceramic material of claim 1 wherein the electro-optic ceramic material has a lanthanum cation fraction of between 0.02 and about 0.05.

6. The electro-optic ceramic material of claim 1 wherein the electro-optic ceramic material has a magnesium cation fraction of between about 0.10 and about 0.15.

7. The electro-optic ceramic material of claim 1 wherein the electro-optic ceramic material has a niobium cation fraction of between about 0.20 and about 0.29.

8. The electro-optic ceramic material of claim 1 wherein the electro-optic ceramic material has a titanium cation fraction of between about 0.07 and about 0.18.

9. An electro-optic ceramic material consisting essentially of the oxides of
   lead,
   magnesium,
   niobium,
   titanium, and
   lanthanum,
   wherein the electro-optic material has a propagation loss of less than about 3 dB/cm and a quadratic electro-optic coefficient of greater than about $2 \times 10^{-16}$ $m^2/V^2$ at 20° C. at a wavelength of 1550 nm, and wherein the electro-optic ceramic material comprises has the formula

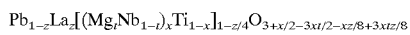

$$Pb_{1-z}La_z[(Mg_tNb_{1-t})_xTi_{1-x}]_{1-z/4}O_{3+x/2-3xt/2-xz/8+3xtz/8}$$

wherein
   x is between about 0.60 and about 0.95,
   z is between 0.04 and about 0.08, and
   t is between about 0.30 and about 0.36.

10. The electro-optic ceramic material of claim 9 wherein x is between about 0.65 and about 0.90.

11. The electro-optic ceramic material of claim 9 wherein z is between about 0.04 and about 0.06.

12. The electro-optic ceramic material of claim 9 wherein t is between about 0.32 and about 0.34.

13. An electro-optic device comprising an electro-optic ceramic material consisting essentially of the oxides of
    lead,
    magnesium,
    niobium,
    titanium, and
    lanthanum
    wherein the electro-optic ceramic material has a propagation loss of less than about 3 dB/cm and a quadratic electro-optic coefficient of greater than about $2 \times 10^{-16}$ $m^2/V^2$ at 20° C. at a wavelength of 1550 nm, and
    wherein the ceramic material has
    a lead cation fraction of between about 0.40 and about 0.51;
    a lanthanum cation fraction between 0.02 and about 0.06;

a magnesium cation fraction of between about 0.06 and about 0.19;

a niobium cation fraction of between about 0.16 and about 0.36; and a titanium cation fraction of between about 0.02 and about 0.27, and wherein the electro-optic ceramic material is configured as the electro-optic material in an electro-optic device.

14. The electro-optic device of claim 13 wherein the electro-optic ceramic material has a propagation loss of less than about 1.5 dB/cm at a wavelength of 1550 nm.

15. The electro-optic device of claim 13 wherein the electro-optic ceramic material has a quadratic electro-optic coefficient of greater than about $3 \times 10^{-16}$ m$^2$/V$^2$ at 20° C. at a wavelength of 1550 nm.

16. The electro-optic ceramic device of claim 13 wherein the electro-optic ceramic material has a lanthanum cation fraction of between about 0.02 and about 0.05.

17. The electro-optic device of claim 13 wherein the electro-optic device is selected from the group consisting of an intensity modulator, a phase modulator, a switch, a phase retarder, a polarization controller, and a variable optical attenuator.

18. An electro-optic device comprising an electro-optic ceramic material consisting essentially of the oxides of lead, magnesium, niobium, titanium, and lanthanum, wherein the electro-optic material has a propagation loss of less than about 3 dB/cm and a quadratic electro-optic coefficient of greater than about $2 \times 10^{-16}$ m$^2$/V$^2$ at 20° C. at a wavelength of 1550 nm, and wherein the electro-optic ceramic material has the formula

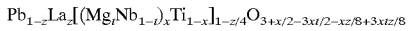

$$Pb_{1-z}La_z[(Mg_tNb_{1-t})_xTi_{1-x}]_{1-z/4}O_{3+x/2-3xt/2-xz/8+3xtz/8}$$

wherein x is between about 0.60 and about 0.95, z is between 0.04 and about 0.08, and t is between about 0.30 and about 0.36, and wherein the electro-optic ceramic material is configured as the electro-optic material in an electro-optic device.

* * * * *